US012078944B2

(12) United States Patent
Tanemura et al.

(10) Patent No.: US 12,078,944 B2
(45) Date of Patent: Sep. 3, 2024

(54) INTERMEDIATE TRANSFER BELT, TRANSFER DEVICE, AND IMAGE FORMING APPARATUS

(71) Applicant: FUJIFILM BUSINESS INNOVATION CORP., Tokyo (JP)

(72) Inventors: Daisuke Tanemura, Kanagawa (JP); Masato Ono, Kanagawa (JP); Shigeru Fukuda, Kanagawa (JP); Masato Furukawa, Kanagawa (JP); Hiroaki Tanaka, Kanagawa (JP); Yosuke Kubo, Kanagawa (JP); Iori Nishimura, Kanagawa (JP); Masayuki Seko, Kanagawa (JP); Koichi Matsumoto, Kanagawa (JP); Satoya Sugiura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/353,397

(22) Filed: Jul. 17, 2023

(65) Prior Publication Data

US 2024/0152077 A1 May 9, 2024

(30) Foreign Application Priority Data

Oct. 25, 2022 (JP) ................................ 2022-170991
Mar. 24, 2023 (JP) ................................ 2023-048789

(51) Int. Cl.
*G03G 15/16* (2006.01)

(52) U.S. Cl.
CPC ......... *G03G 15/162* (2013.01); *G03G 15/161* (2013.01)

(58) Field of Classification Search
CPC ........................... G03G 15/162; G03G 15/161
See application file for complete search history.

(56) References Cited

U.S. PATENT DOCUMENTS

| | | | | |
|---|---|---|---|---|
| 9,063,475 B2 | 6/2015 | Aoto et al. | | |
| 2009/0042117 A1 | 2/2009 | Nakamura et al. | | |
| 2009/0169236 A1* | 7/2009 | Fukao | G03G 15/161 | 399/346 |
| 2011/0064452 A1* | 3/2011 | Mizusawa | G03G 15/161 | 399/346 |
| 2011/0293824 A1 | 12/2011 | Aoto et al. | | |
| 2013/0077989 A1* | 3/2013 | Saito | G03G 15/161 | 399/346 |
| 2014/0248069 A1* | 9/2014 | Kubo | G03G 15/162 | 399/302 |

FOREIGN PATENT DOCUMENTS

| | | |
|---|---|---|
| JP | 2009-042550 A | 2/2009 |
| JP | 2011-039430 A | 2/2011 |
| JP | 2011-242724 A | 12/2011 |
| JP | 5578416 B2 | 8/2014 |
| JP | 2015-141316 A | 8/2015 |
| JP | 6213320 B2 | 10/2017 |

* cited by examiner

*Primary Examiner* — Sandra Brase
(74) *Attorney, Agent, or Firm* — Oliff PLC

(57) ABSTRACT

An intermediate transfer belt has metal oxide particles as a solid lubricant on a surface of the intermediate transfer belt, in which an average spacing between the metal oxide particles on the surface is 1,000 nm or less, and an average height of the metal oxide particles from the surface is 15 nm or more and 320 nm or less.

12 Claims, 2 Drawing Sheets

INTERMEDIATE TRANSFER BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-170991 filed Oct. 25, 2022 and No. 2023-048789 filed Mar. 24, 2023.

BACKGROUND

(i) Technical Field

The present invention relates to an intermediate transfer belt, a transfer device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium so that an image is formed. For the transfer of the toner image to the recording medium, for example, an intermediate transfer belt is used.

For example, JP2011-039430A discloses "an intermediate transfer belt that is used in an electrophotographic image forming apparatus and has a substrate layer and a surface layer, in which the surface layer consists of a coat layer formed of a material containing at least a binder resin and inorganic fine particles having a volume-average particle size of 30 nm to 200 nm, and the inorganic fine particles are unevenly distributed and fixed on a surface of the coat layer".

JP2011-242724A discloses "an elastic transfer belt that includes a base layer containing a polyimide resin or a polyamide-imide resin and an elastic layer laminated on the base layer, in which spherical particles with an average particle size of 0.5 to 4 μm having a refractive index higher than a refractive index of the elastic layer at a wavelength of 900 nm are spread on the elastic layer".

JP2015-141316A discloses "a manufacturing method of an electrophotographic photoreceptor that includes a conductive support, an interlayer formed on the conductive support, and a photosensitive layer formed on the interlayer, the manufacturing method having steps of performing a hydrophobic treatment on a raw material of metal oxide fine particle by using an organic compound to obtain metal oxide fine particles, preparing a coating liquid for forming an interlayer having the metal oxide fine particles and a binder resin, and coating an outer peripheral surface of the conductive support with the coating liquid for forming an interlayer to form an interlayer, in which an amount of electrolyte in the raw material of the metal oxide fine particles subjected to the hydrophobic treatment is 20 μS/cm or more and 500 μS/cm or less".

SUMMARY

Aspects of non-limiting embodiments of the present disclosure relate to an intermediate transfer belt that is better in sustainability of toner transfer to paper having roughness, compared to an intermediate transfer belt that satisfies at least either a condition that an average spacing between metal oxide particles on a surface of the intermediate transfer belt be more than 1,000 nm or a condition that an average height of the metal oxide particles from the surface be less than 15 nm and more than 320 nm. Aspects of non-limiting embodiments of the present disclosure also relate to a transfer device and an image forming apparatus that include the intermediate transfer belt.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided an intermediate transfer belt having metal oxide particles as a solid lubricant on a surface of the intermediate transfer belt, in which an average spacing between the metal oxide particles on the surface is 1,000 nm or less, and an average height of the metal oxide particles from the surface is 15 nm or more and 320 nm or less.

BRIEF DESCRIPTION OF THE DRAWINGS

Exemplary embodiment(s) of the present invention will be described in detail based on the following figures, wherein.

DETAILED DESCRIPTION

Figure 1:
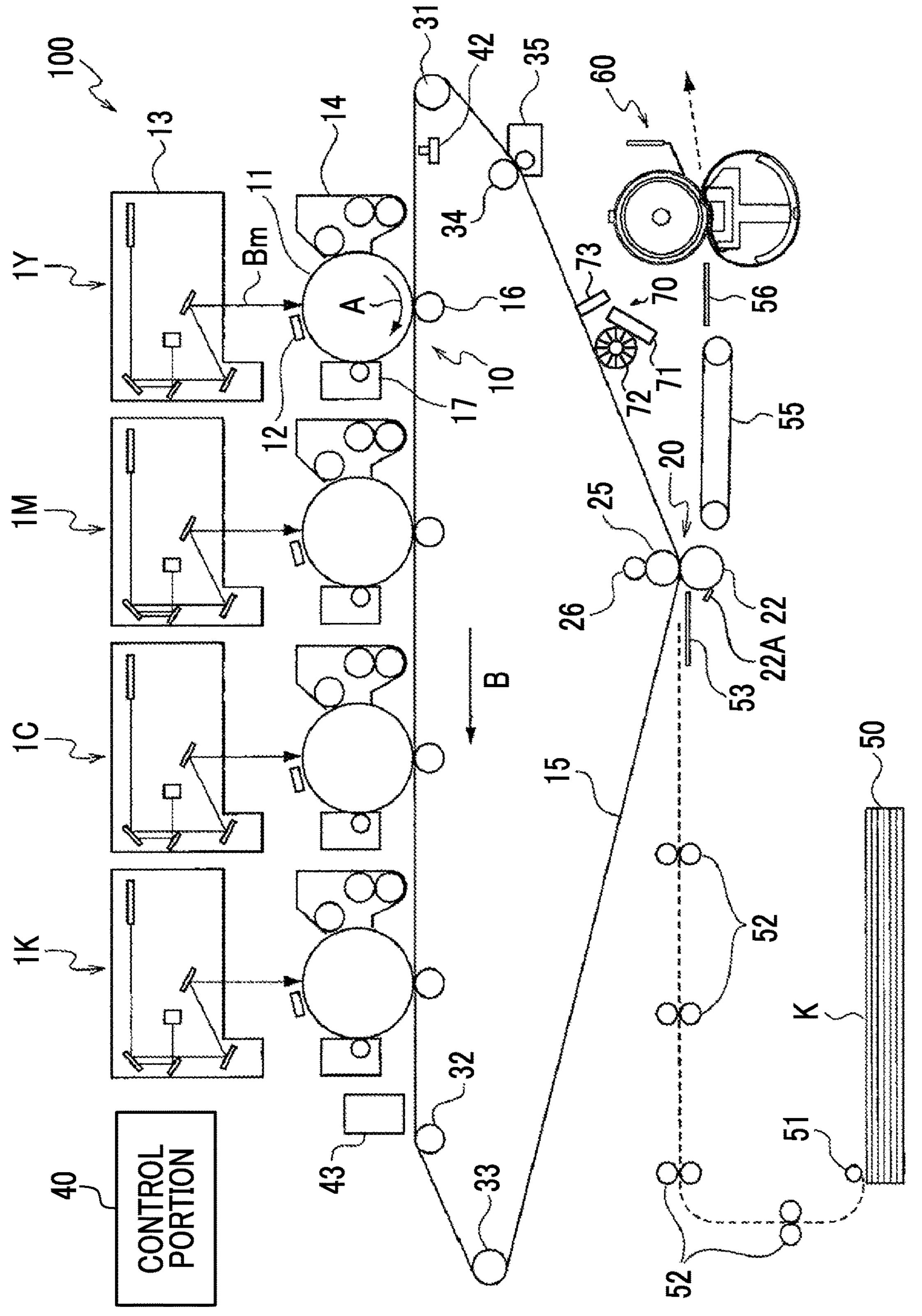
FIG. 1 is a schematic configuration view showing an example of an image forming apparatus according to the present exemplary embodiment.

Hereinafter, the present exemplary embodiment as an example of the present invention will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more substances corresponding to each component in the composition, unless otherwise specified, the amount of each component means the total amount of two or more substances present in the composition.

Intermediate Transfer Belt

The intermediate transfer belt according to the present exemplary embodiment is an intermediate transfer belt that has metal oxide particles as a solid lubricant on a surface thereof, in which an average spacing between the metal oxide particles on the surface is 1,000 nm or less, and an average height of the metal oxide particles from the surface is 15 nm or more and 320 nm or less.

Having the above configuration, the intermediate transfer belt according to the present exemplary embodiment is excellent in sustainability of toner transfer to paper having roughness. The reason is unclear, but is presumed as follows.

In the field of an electrophotographic apparatus, in a transfer device that cleans the outer peripheral surface of an intermediate transfer belt with a cleaning blade, the sustainability of toner image transfer to paper having roughness (that is, a recording medium having surface roughness such as embossed paper, which will be also simply called "embossed paper" hereinafter) deteriorates. While images are being repeatedly formed, the discharge products generated from an image holder or the like are deposited on the surface of the intermediate transfer belt, which gradually increases the adhesion between the intermediate transfer belt and a toner and causes the deterioration of sustainability of toner image transfer. Particularly, in the region of edge of the recess in the embossed paper, the embossed paper is pressed on the intermediate transfer belt with a weak pressing force at the position where the toner image is transferred from the intermediate transfer belt (that is, a secondary transfer portion). Therefore, the sustainability of toner transfer deteriorates.

On the other hand, the intermediate transfer belt according to the present exemplary embodiment has metal oxide particles as a solid lubricant on a surface thereof. The metal oxide particles present on the surface of the intermediate transfer belt are deposited on a contact portion with a cleaning blade and form a particle dam, and the particle dam functions to scrape off (polish) the deposits (for example, discharge products) on the surface of the intermediate transfer belt. Therefore, the increase in the adhesion between the intermediate transfer belt and the toner resulting from the deposits is suppressed, and the toner transferability to the embossed paper is sustained even after image formation is repeatedly performed.

In the intermediate transfer belt according to the present exemplary embodiment, an average spacing between metal oxide particles on the surface (hereinafter, also simply called "particle spacing") is 1,000 nm or less, and an average height of the metal oxide particles from the surface (hereinafter, also simply called "particle height") is 15 nm or more and 320 nm or less. In a case where a toner is transferred to the intermediate transfer belt having metal oxide particles on the surface thereof, the metal oxide particles are interposed between the toner and the intermediate transfer belt. Furthermore, in a case where the particle spacing and the particle height are in the above ranges, the interposed metal oxide particles form appropriate voids between the toner and the intermediate transfer belt, which reduces the Van der Waals force between the toner and the intermediate transfer belt. Therefore, the increase in the adhesion between the intermediate transfer belt and the toner resulting from the deposits is suppressed, and the toner transferability to the embossed paper is sustained even after image formation is repeatedly performed.

However, in a case where the particle spacing is more than 1,000 nm, because the number of metal oxide particles is small, the metal oxide particles are not interposed between the toner and the intermediate transfer belt, and the amount of toner that comes into direct contact with the intermediate transfer belt increases. In that case, due to the deposits, the adhesion between the intermediate transfer belt and the toner increases, and the sustainability of toner transfer to embossed paper after the repeated image formation deteriorates. In addition, in a case where the particle height of the metal oxide particles is more than 320 nm, the contact area between the toner and the metal oxide particles increases, the Van der Waals force between the toner and the metal oxide particles increases, and the adhesion between the toner and the metal oxide particles increases. Accordingly, the sustainability of toner transfer to embossed paper after the repeated image formation deteriorates. Furthermore, in a case where the metal oxide particles have a small particle height, which is less than 15 nm, appropriate voids are not formed between the toner and the intermediate transfer belt, and the Van der Waals force between the toner and the intermediate transfer belt increases. Therefore, due to the deposits, the adhesion between the intermediate transfer belt and the toner increases, and the sustainability of toner transfer to embossed paper after the repeated image formation deteriorates.

As described above, the intermediate transfer belt according to the present exemplary embodiment is excellent in the sustainability of toner transfer to embossed paper.

Hereinafter, the intermediate transfer belt according to the present exemplary embodiment will be specifically described.

Metal Oxide Particles

The intermediate transfer belt has metal oxide particles as a solid lubricant on a surface thereof.

Particle Spacing

The average spacing (particle spacing) between the metal oxide particles on the surface is 1,000 nm or less.

In a case where the particle spacing is more than 1,000 nm, the sustainability of toner transfer to embossed paper after the repeated image formation deteriorates.

From the viewpoint of improving the initial toner transferability, for example, the lower limit of the particle spacing is preferably 3 nm or more.

From the viewpoint of sustainability of toner transfer and initial toner transferability, for example, the particle spacing is preferably 3 nm or more and 200 nm or less, and more preferably 10 nm or more and 150 nm or less.

The particle spacing is controlled by adjusting the amount of the metal oxide particles supplied to the surface of the intermediate transfer belt, adjusting the degree of aggregation of the metal oxide particles, and the like.

The average spacing (particle spacing) between metal oxide particles means the average of spacing between the adjacent metal oxide particles. "Spacing" means a distance between the apex of a particle (the point farthest from the surface of the intermediate transfer belt) and the apex of a particle adjacent to the aforementioned particle. In a case where the metal oxide particles are aggregated, the aggregated particles are regarded as one particle.

The particle spacing is measured by the following method.

An SEM image of the surface of the intermediate transfer belt on which the metal oxide particles is captured, 10 straight lines are randomly drawn on the binarized image of the captured image, the lengths of regions that are not the metal oxide particles are measured, and the arithmetic mean of the lengths is calculated.

Particle Height

The average height (particle height) of the metal oxide particles from the surface is 15 nm or more and 320 nm or less.

In a case where the particle height is more than 320 nm, the initial toner transferability deteriorates. In a case where the particle height is less than 15 nm, the sustainability of toner transfer to embossed paper after the repeated image formation deteriorates.

From the viewpoint of sustainability of toner transfer and initial toner transferability, for example, the particle height is preferably 30 nm or more and 150 nm or less, and more preferably 40 nm or more and 130 nm or less.

The particle height is controlled by adjusting the particle size of the metal oxide particles, adjusting the degree of aggregation of the metal oxide particles, and the like.

The average height (particle height) of the metal oxide particles from the surface means the average of heights of the metal oxide particles present on the surface of the intermediate transfer belt from the surface. "Height" means a distance to the apex of a particle (the point farthest from the surface of the intermediate transfer belt). In a case where the metal oxide particles are aggregated, the aggregated particles are regarded as one particle.

The particle height is measured by the following method.

A cross section of the belt in the thickness direction created using ion beams is imaged using SEM, binarization processing is performed on the cross-sectional image, and the particle height is measured.

Aspect Ratio of Particles

The aspect ratio of the metal oxide particles is, for example, preferably 1 or more and 1.8 or less. That is, for example, it is preferable that the shape of the metal oxide particles be close to a spherical shape.

In a case where the aspect ratio is 1.8 or less, appropriate voids are formed between the toner and the intermediate transfer belt by the interposed metal oxide particles, and the toner transferability to embossed paper is likely to be better sustained even after the repeated image formation.

From the viewpoint of sustainability of toner transfer and initial toner transferability, the aspect ratio is, for example, more preferably 1 or more and 1.4 or less.

The aspect ratio of the metal oxide particles means a ratio of a major axis length to a minor axis length (major axis length/minor axis length). The major axis length of the metal oxide particles means the maximum length of the metal oxide particles. The minor axis length of the metal oxide particles means the length of the longest axis among the axes in a direction orthogonal to an extension of the major axis of the metal oxide particles.

The aspect ratio of the metal oxide particles is an average of aspect ratios of 100 metal oxide particles obtained using a scanning electron microscope.

Making Particles Hydrophobic

For example, it is preferable that the surface of the metal oxide particles have undergone a hydrophobic treatment.

Using the metal oxide particles with a surface having undergone a hydrophobic treatment reduces the adhesion between the toner and the metal oxide particles, which further prevents the initial toner transferability and the sustainability of toner transfer to embossed paper after the repeated image formation from deteriorating.

Examples of the hydrophobic treatment agent used for the hydrophobic treatment on the surface include known organosilicon compounds having an alkyl group (for example, a methyl group, an ethyl group, a propyl group, a butyl group, or the like). Specifically, examples thereof include a silazane compound (for example, a silane compound such as methyltrimethoxysilane, dimethyldimethoxysilane, trimethylchlorosilane, trimethylmethoxysilane, or octyltriethoxysilane, hexamethyldisilazane, tetramethyldisilazane, or the like), and the like. One hydrophobic treatment agent may be used alone, or two or more hydrophobic treatment agents may be used in combination.

The surface free energy of the metal oxide particles is, for example, preferably 54 $mJ/m^2$ or less. In a case where the surface free energy of the metal oxide particles is in the above range, the adhesion of the toner to the intermediate transfer belt is reduced, excellent sustainability of toner transfer to paper having roughness is obtained, and particularly, excellent sustainability of toner transfer to paper having roughness is obtained for an image forming apparatus that may be operated at a high speed. The surface free energy is adjusted by the extent of hydrophobic treatment on the surface of the metal oxide particles, the choice of the hydrophobic treatment agent to be used, and the like.

The surface free energy of the metal oxide particles is, for example, more preferably 45 $mJ/m^2$ or less, and even more preferably 30 $mJ/m^2$ or less.

The surface free energy of the metal oxide particles is measured by the following method.

Based on the OWRK method, water and diiodomethane having known surface free energies are used, the water is added dropwise to the surface of pressed powder of metal oxide particles to measure the contact angle of water, the diiodomethane is added dropwise to the surface of the pressed powder of the metal oxide particles to measure the contact angle of diiodomethane, and the surface free energy ($mJ/m^2$) is calculated.

Type of Metal Oxide Particles Examples of the metal oxide particles include silica particles ($SiO_2$), titania particles ($TiO_2$), alumina particles ($Al_2O_3$), cerium oxide particles, magnesium oxide particles, zinc oxide particles, and zirconia particles ($ZrO_2$).

Among these, for example, silica particles are preferable as the metal oxide particles.

Using silica particles as the metal oxide particles further improves the ability (polishing ability) to scrape off deposits (for example, discharge products) in a case where the silica particles are deposited on a contact portion between the intermediate transfer belt and a cleaning blade and form a particle dam. Therefore, even after images are repeatedly formed, the toner transferability to embossed paper is more likely to be sustained.

Configuration of Intermediate Transfer Belt

The intermediate transfer belt according to the present exemplary embodiment has a belt body and metal oxide particles as a solid lubricant present on a surface (that is, an outer peripheral surface) of the belt body.

The belt body may be a single layer of a resin substrate layer, or may be a laminate including a resin substrate layer.

Examples of the laminate including a resin substrate layer include a laminate in which an elastic layer is provided on the outer peripheral surface of a resin substrate layer, a laminate in which a resin layer is provided on the inner peripheral surface of a resin substrate layer, and a laminate in which an elastic layer and a resin layer are provided on the outer peripheral surface of a resin substrate layer and on the inner peripheral surface of the resin substrate layer respectively.

As the elastic layer provided on the outer peripheral surface of a resin substrate layer and the resin layer provided on the inner peripheral surface of the resin substrate layer, known layers adopted for the intermediate transfer belt are used.

Resin Substrate Layer

The resin substrate layer contains, for example, a resin and a conducting agent. As necessary, the resin substrate layer may contain other known components.

Resin

Examples of the resin include a polyimide resin (PI resin), a polyamide-imide resin (PAI resin), an aromatic polyether ketone resin (for example, an aromatic polyether ether ketone resin or the like), a polyphenylene sulfide resin (PPS resin), and a polyetherimide resin (PEI resin), a polyester resin, a polyamide resin, a polycarbonate resin, and the like.

From the viewpoint of mechanical strength and dispersibility of the conducting agent, the resin is, for example, preferably a polyimide-based resin (that is, a resin containing a constitutional unit having an imide bond), more preferably a polyimide resin or a polyamide-imide resin, and even more preferably a polyimide resin.

Examples of the polyimide resin include an imidized polyamic acid (polyimide resin precursor) which is a polymer of a tetracarboxylic acid dianhydride and a diamine compound.

Examples of the polyimide resin include a resin having a constitutional unit represented by General Formula (I).

General Formula (I)

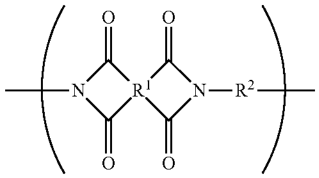

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-δ-aminophenyl)benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the resin with respect to the resin substrate layer is, for example, preferably 60% by mass or more and 95% by mass or less, more preferably 70% by mass or more and 95% by mass or less, and even more preferably 75% by mass or more and 90% by mass or less.

Conducting Agent

Examples of the conducting agent include conductive particles (for example, particles having a volume resistivity less than $10^7$ Ω·cm, the same applies hereinafter) and semi-conductive particles (for example, particles having a volume resistivity of $10^7$ Ω·cm or more and $10^{13}$ Ω·cm or less, the same applies hereinafter).

Specifically, the conducting agent is not particularly limited, and examples thereof include carbon black, a metal (for example, aluminum, nickel, or the like), a metal oxide (for example, yttrium oxide, tin oxide, or the like), an ion conducting substance (for example, potassium titanate, LiCl, or the like), and the like.

The conducting agent is selected depending on the intended use thereof. For example, carbon black is preferable.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the carbon black is, for example, preferably 2 nm or more and 40 nm or less, more preferably 8 nm or more and 20 nm or less, and even more preferably 10 nm or more and 15 nm or less.

The average particle size of the conducting agent (particularly carbon black) is measured by the following method.

First, by a microtome, a measurement sample having a thickness of 100 nm is collected from the resin substrate layer and observed with a transmission electron microscope (TEM). Then, the diameters of circles each having an area equivalent to the projected area of each of 50 conducting agents (that is, equivalent circle diameters) are adopted as particle sizes, and the average thereof are adopted as the average particle size.

From the viewpoint of mechanical strength, volume resistivity, and the like, the content of the conducting agent with respect to the resin substrate layer is, for example, preferably 10% by mass or more and 50% by mass or less, more preferably 12% by mass or more and 40% by mass or less, and even more preferably 15% by mass or more and 30% by mass or less.

Other Components

Examples of other components include a filler for improving mechanical strength, an antioxidant for preventing thermal deterioration of a belt, a surfactant for improving fluidity, a heat-resistant antioxidant, and the like.

In a case where the substrate layer contains other components, the content of the other components with respect to the resin substrate layer is, for example, preferably more than 0% by mass and 10% by mass or less, more preferably more than 0% by mass and 5% by mass or less, and even more preferably more than 0% by mass and 1% by mass or less.

Thickness of Resin Substrate Layer

From the viewpoint of mechanical strength, the thickness of the resin substrate layer is, for example, preferably 60 μm or more and 120 μm or less, and more preferably 80 μm or more and 120 μm or less.

The thickness of the resin substrate layer is measured as follows.

That is, a cross section of the resin substrate layer taken along the thickness direction is observed with an optical microscope or a scanning electron microscope, the thickness of the layer as a measurement target is measured at 10 sites, and the average thereof is adopted as the thickness.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, preferably 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq, expresses the surface resistivity in a logarithm of resistance per unit area, which is also written as log(Ω/suq.), log Ω/square, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Manufacturing Method of Intermediate Transfer Belt

The manufacturing method of an intermediate transfer belt according to the present exemplary embodiment includes, for example, a step of preparing a belt body and a step of applying metal oxide particles as a solid lubricant to an outer peripheral surface of the belt body.

In a step of preparing a belt body, a known manufacturing method of an intermediate transfer belt is used to obtain the belt body.

Examples of the step of applying the metal oxide particles include the following aspects (1), (2), and (3). Among these, for example, the aspect (1) is preferable.

(1) Aspect in which a supply member is brought into contact with a molded product of metal oxide particles to scrape off the metal oxide particles, and the scraped metal oxide particles are supplied to a surface of a belt body.

(2) Aspect in which a molded product of metal oxide particles is directly pressed on an intermediate transfer belt (that is, the belt body), such that the molded product is worn away to supply the metal oxide particles to a surface of a belt body.

(3) Aspect in which an appropriate amount of powdery metal oxide particles are placed on a supply member such as a roll and supplied to a surface of a belt body from the supply member.

Transfer Device

First Exemplary Embodiment

The transfer device according to the present exemplary embodiment includes an intermediate transfer belt that has a surface (that is, an outer peripheral surface) to which a toner image is to be transferred, a primary transfer device that has a primary transfer member performing primary transfer of a toner image formed on a surface of an image holder to the surface of the intermediate transfer belt, a secondary transfer device that has a secondary transfer member which is arranged in contact with the surface of the intermediate transfer belt and performs secondary transfer of the toner image transferred to the surface of the intermediate transfer belt to a surface of a recording medium, and a cleaning device that has a cleaning blade cleaning the surface of the intermediate transfer belt. As the intermediate transfer belt, the intermediate transfer belt according to the present exemplary embodiment is used.

Having the above configuration, the transfer device according to the first exemplary embodiment is excellent in sustainability of toner transfer to paper having roughness.

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the surface of the intermediate transfer belt is performed.

In the secondary transfer device, the secondary transfer member is arranged on a toner image-holding side of the intermediate transfer belt. The secondary transfer device includes, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, secondary transfer of the toner image formed on the intermediate transfer belt to the recording medium is performed.

The secondary transfer member may be a secondary transfer roll or a secondary transfer belt. As the back surface member, for example, a back roll is used.

In the cleaning device, the cleaning blade is arranged on a toner image-holding side of the intermediate transfer belt. The cleaning device includes, for example, the cleaning blade and a back surface member that is arranged on the side opposite to the toner image-holding side of the intermediate transfer belt. In the cleaning device, for example, in a state where the intermediate transfer belt is interposed between the cleaning blade and the back surface member, the cleaning blade cleans the surface of the intermediate transfer belt.

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from an image holder, performing secondary transfer of the toner image to a second intermediate transfer belt from the first intermediate transfer belt, and then performing tertiary transfer of the toner image to a recording medium from the second intermediate transfer belt.

As at least one of the plurality of intermediate transfer belts of the transfer device, the intermediate transfer belt according to the present exemplary embodiment is used.

Second Exemplary Embodiment

The transfer device according to a second exemplary embodiment includes an intermediate transfer belt that has a surface to which a toner image is to be transferred, a primary transfer device that has a primary transfer member performing primary transfer of a toner image formed on a surface of an image holder to the surface of the intermediate transfer belt, a secondary transfer device that has a secondary transfer member which is arranged in contact with the surface of the intermediate transfer belt and performs secondary transfer of the toner image transferred to the surface of the intermediate transfer belt to a surface of a recording medium, a cleaning device that has a cleaning blade cleaning the surface of the intermediate transfer belt, and a metal oxide particle supply device that is arranged in contact with the surface of the intermediate transfer belt and supplies metal oxide particles as a solid lubricant to the surface of the intermediate transfer belt.

Having the above configuration, the transfer device according to the second exemplary embodiment is excellent in sustainability of toner transfer to paper having roughness.

In the transfer device according to the second exemplary embodiment, the metal oxide particle supply device is provided, for example, on the downstream side of the secondary transfer device in the rotation direction of the intermediate transfer belt and on the upstream side of the cleaning device in the rotation direction of the intermediate transfer belt.

For example, in an aspect, the metal oxide particle supply device has a molded product of metal oxide particles as a solid lubricant and a metal oxide particle supply member (the aforementioned aspect (1)).

Examples of the molded product of metal oxide particles include metal oxide particles solidified together with a binder resin in a solid state, and a molded product obtained by performing compression molding on metal oxide particles, and the like. The shape of the molded product includes a rod shape, a plate shape (that is, a blade shape), and the like.

Examples of the metal oxide particle supply member include a rotary brush, a rubber roll, and the like. Among these, a rotary brush is preferable. While rotating, the rotary brush and the rubber roll come into contact with a molded product of metal oxide particles to scrape off the metal oxide particles and supply the scraped metal oxide particles to the surface of the intermediate transfer belt.

For example, in another aspect, the metal oxide particle supply device directly presses the intermediate transfer belt (that is, the belt body) on the molded product of metal oxide particles (the aforementioned aspect (2)). As a result of wear of the molded product of metal oxide particles directly pressed on the intermediate transfer belt, the metal oxide particles are supplied to the surface of the belt body.

The configuration of the transfer device according to the second exemplary embodiment is the same as the configuration of the transfer device according to the first exemplary embodiment, except for the metal oxide particle supply device.

Image Forming Apparatus

The image forming apparatus according to the present exemplary embodiment includes a toner image forming device that forms a toner image on a surface of an image holder and a transfer device that transfers the toner image formed on the surface of the image holder to a surface of a recording medium. As the transfer device, the transfer device according to the first exemplary embodiment or the transfer device according to the second exemplary embodiment is used.

Examples of the toner image forming device include a device including an image holder, a charging device that charges the surface of the image holder, an electrostatic latent image forming device that forms an electrostatic latent image on the surface of the charged image holder, and a developing device that develops the electrostatic latent image formed on the surface of the image holder with a developer containing a toner to form a toner image.

As the image forming apparatus according to the present exemplary embodiment, known image forming apparatuses are used which include an apparatus including a fixing means that fixes a toner image transferred to the surface of a recording medium; an apparatus including a cleaning means that cleans the surface of an image holder not yet being charged after transfer of a toner image; an apparatus including an electricity removing means that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

The example of the image forming apparatus to be described with reference to drawings is an image forming apparatus that uses the transfer device according to the second exemplary embodiment as a transfer device. In the image forming apparatus that uses the transfer device according to the first exemplary embodiment as a transfer device, a solid lubricant supply device may or may not be provided in the transfer device.

Image Forming Apparatus

FIG. 1 is a schematic configuration view showing the configuration of the image forming apparatus according to the present exemplary embodiment.

As shown in FIG. 1, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging means, a charger 12 for charging the photoreceptor 11 is provided around the photoreceptor 11. As an example of a latent image forming means, a laser exposure machine 13 that draws an electrostatic latent image on the photoreceptor 11 is provided (in FIG. 1, an exposure beam is represented by a mark Bm).

Around the photoreceptor 11, as an example of a developing means, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 1 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^{7}$ Ω/□ or more and $1\times10^{10}$Ω/□ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ω·cm or more and $10^{8.5}$ Ω·cm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt-cleaning member 35 separable from the intermediate transfer belt 15 is provided which removes the residual toner or paper powder on the intermediate transfer belt 15 remaining after the secondary transfer and cleans the surface of the intermediate transfer belt 15. Examples of the intermediate transfer belt-cleaning member 35 include a cleaning roll. The intermediate transfer belt-cleaning member 35 may be a cleaning blade.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the surface of the secondary transfer roll 22. Examples of the secondary transfer roll-cleaning member 22A include a cleaning blade. The secondary transfer roll-cleaning member 22A may be a cleaning roll.

A metal oxide particle supply device 70 that supplies metal oxide particles as a solid lubricant is provided on the downstream side of the secondary transfer portion 20 and the upstream side of the intermediate transfer belt-cleaning member 35 of the intermediate transfer belt 15.

The metal oxide particle supply device 70 has a molded product 71 of metal oxide particles, a metal oxide particle supply member 72 that scrapes off the molded product of metal oxide particles to supply metal oxide particles to the surface of the intermediate transfer belt 15, and a sliding member 73 that slides to rub the metal oxide particles against the surface of the intermediate transfer belt 15 and form a coating of the metal oxide particles.

The configuration including the intermediate transfer belt 15, the primary transfer roll 16, the secondary transfer roll 22, the intermediate transfer belt-cleaning member 35, and the metal oxide particle supply device 70 corresponds to an example of the transfer device.

Figure 2:
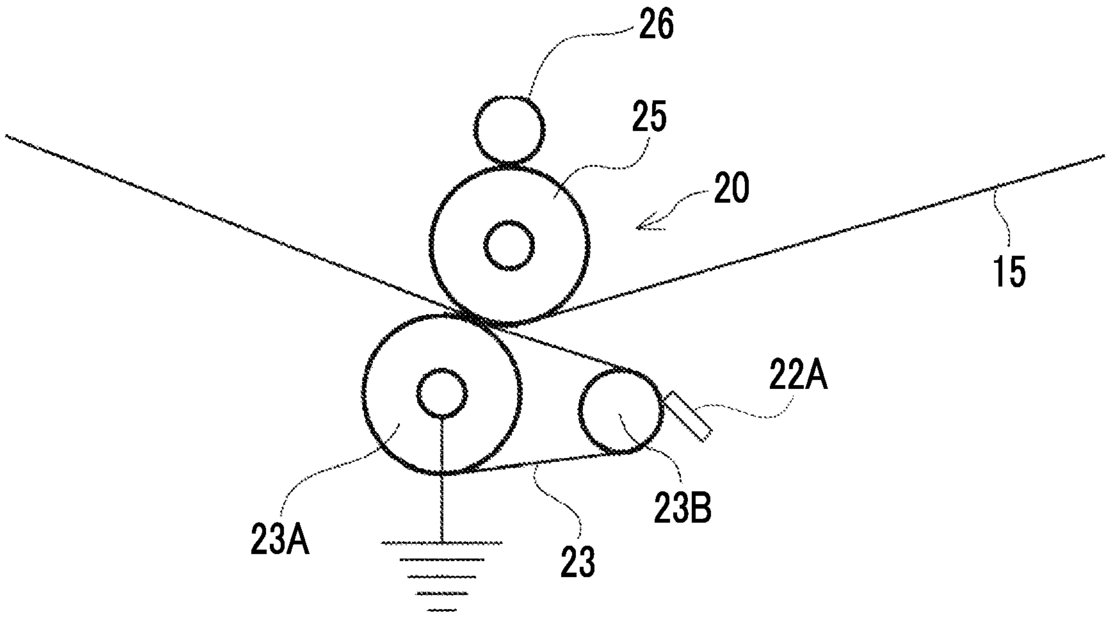
FIG. 2 is a schematic configuration view showing the periphery of a secondary transfer portion in another example of the image forming apparatus according to the present exemplary embodiment.

The image forming apparatus 100 may have a configuration in which the apparatus includes a secondary transfer belt (an example of a secondary transfer member) instead of the secondary transfer roll 22. Specifically, as shown in FIG. 2, the image forming apparatus 100 may include a secondary transfer device including a secondary transfer belt 23, a driving roll 23A that is arranged to face the back roll 25 via the secondary transfer belt 23 and the intermediate transfer belt 15, and an idler roll 23B that allows the secondary transfer belt 23 to be stretched thereon in cooperation with the driving roll 23A.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The image forming apparatus according to the present exemplary embodiment includes, as a transport means for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport means, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and the intermediate transfer belt-cleaning member 35.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, unless otherwise specified, "parts" and "%" are based on mass in all cases.

Example 1

Belt Body Preparing Step

A PI precursor solution is prepared which is obtained by dissolving polyamic acid consisting of a polymer of 3,3',4,4'-biphenyltetracarboxylic acid dianhydride and 4,4'-diaminodiphenyl ether is dissolved in N-methyl-2-pyrrolidone (NMP), there. The PI precursor solution is a solution in which the solid content of a polyimide resin after imidization of the polyamic acid is 18% by mass.

Then, carbon black (FW200: manufactured by Orion Engineered Carbons, average particle size=13 nm) is added to the PI precursor solution such that the amount of carbon black is 19 parts by mass with respect to 100 parts by mass of the solid content of the polyamic acid, followed by mixing and stirring, thereby preparing a PI precursor solution containing dispersed carbon black.

Thereafter, in a state where an aluminum cylinder is being rotated, via a dispenser, the PI precursor solution containing dispersed carbon black is jetted at a width of 500 mm to the outer surface of the cylinder.

Next, the cylinder is heated and dried at 140° C. for 30 minutes in a state of being kept horizontal, heated for 120 minutes such that the maximum temperature reaches 320° C., and cut into a belt body having a thickness of 80 μm (that is, a single polyimide resin layer) at a width of 363 mm.

Through the above steps, an intermediate transfer belt body is obtained.

Solid Lubricant

As the solid lubricant, the silica particles shown in Table 1 are solidified together with a binder resin, thereby obtaining a plate-shaped molded article.

The plate-shaped molded article is cut with a rotary brush, thereby preparing a solid lubricant supply device for supplying a solid lubricant to the intermediate transfer belt.

Evaluation Test

By using a modified image forming apparatus "Versant 180 press (manufactured by FUJIFILM Business Innovation Corp.)" equipped with the solid lubricant supply device, the adhesion of a toner and the transferability to embossed paper are evaluated.

The amount of solid lubricant supplied from the solid lubricant supply device is set such that the particle spacing and particle height shown in Table 1 are achieved.

Other Examples and Comparative Examples

Evaluation tests are performed in the same manner as in Example 1, except that the type, particle size, and aspect ratio of the solid lubricant used, whether or not a hydrophobic treatment is performed on the surface of the solid lubricant, the type of hydrophobic treatment agent (hydrophobic treatment method), and the degree of hydrophobicity are changed, and that the particle spacing and particle height are adjusted by adjusting the amount of the solid lubricant supplied from the solid lubricant supply device and the like.

In Table 1, "TMS conversion" means conversion into trimethylsilane, "PDMS" represents polydimethylsiloxane, "OTES" represents octyltriethoxysilane, and "Amino Silane" represents aminosilane. Furthermore, "BN" used in Comparative Example 4 is boron nitride.

Evaluation

Adhesion of Toner

The adhesion of a toner to the intermediate transfer belt is measured at the initial stage of image formation (a period during which an image is formed on 10 sheets) and measured over time (a period during which an image is formed on 1,000 sheets, sustainability).

The adhesion of a toner is measured by the following method.

The adhesion of a toner means a spray pressure (unit: MPa) of air at which all of polyester resin particles having adhered to the outer peripheral surface of the intermediate transfer belt are spaced apart from the outer peripheral surface, in a case where polyester resin particles having a volume-average particle size of 4.7 μm are caused to adhere to the outer peripheral surface under a load of 46 g/cm$^2$, and then air is sprayed on the outer peripheral surface from above the outer peripheral surface at a spray pressure that is being increased.

Transferability

A 30% halftone blue image is printed on 1,000 sheets of embossed paper (BOSSYUKI), and filling of recesses is visually observed at the initial stage (period during which the image is formed on 10 sheets) and visually observed over time (period during which the image is formed on 1,000 sheets, sustainability). By the comparison between the first image and the 10th image and between the first image and the 1,000th image, the transferability is evaluated. The evaluation standard is as follows.

A+ (◎+): Just as the first image, color omission of recesses does not occur.

A (◎): There is no change from the first image, and slight color omission of recesses is observed.

B (○): Color omission of recesses is slightly worse than the first image.

C (Δ): Color omission of recesses is more serious than B (○), compared with the first image and is not acceptable.

D (x): Color omission of recesses is much more serious than C (○), compared with the first image.

Transferability for High-Speed Machine

The upper limit of number of sheets (unit: ppm) that the image forming apparatus can print out for 1 minute is set to 120 ppm, and the sustainability is evaluated in the same manner as in Transferability described above. The evaluation standard is as follows.

A+(◎+): Just as the first image, color omission of recesses does not occur.

A (◎): There is no change from the first image, and slight color omission of recesses is observed.

B (○): Color omission of recesses is slightly worse than the first image.

C (Δ): Color omission of recesses is more serious than B (○), compared with the first image and is not acceptable.

D (x): Color omission of recesses is much more serious than C (○), compared with the first image.

TABLE 1

| | | Solid lubricant | Particle spacing (nm) | Particle height (nm) | Aspect ratio | Hydrophobic treatment for surface | Hydrophobic treatment method | Surface free energy | Adhesive force of toner | | Transferability to embossed paper | | Transferability to emboss for high-speed machine |
|---|---|---|---|---|---|---|---|---|---|---|---|---|---|
| | | | | | | | | | Initial stage | Sustainability | Initial stage | Sustainability | |
| Example | 1 | $SiO_2$ | 100 | 40 | 1 | Performed | TMS conversion | 25 | 7 | 7 | A+ (◎+) | A+ (◎+) | A+ (◎+) |
| | 2 | $SiO_2$ | 100 | 115 | 1.2 | Performed | TMS conversion | 25 | 9 | 9 | A (◎) | A (◎) | A (◎) |
| | 3 | $SiO_2$ | 3 | 40 | 1 | Performed | TMS conversion | 25 | 8 | 9 | A (◎) | A (◎) | A (◎) |
| | 4 | $SiO_2$ | 950 | 40 | 1 | Performed | TMS conversion | 25 | 8 | 9 | A (◎) | A (◎) | A (◎) |
| | 5 | $SiO_2$ | 100 | 20 | 1 | Performed | TMS conversion | 25 | 9 | 12 | A (◎) | B (○) | B (○) |
| | 6 | $SiO_2$ | 100 | 300 | 1 | Performed | TMS conversion | 25 | 10 | 13 | A (◎) | B (○) | B (○) |
| | 7 | $SiO_2$ | 100 | 40 | 1.4 | Performed | TMS conversion | 25 | 9 | 13 | A (◎) | B (○) | B (○) |
| | 8 | SiO2 | 100 | 100 | 2 | Performed | TMS conversion | 25 | 12 | 14 | B (○) | B (○) | B (○) |
| | 9 | $SiO_2$ | 100 | 40 | 1 | Not performed | | 67 | 12 | 14 | B (○) | B (○) | C (Δ) |

TABLE 1-continued

| | | Solid lubricant | Particle spacing (nm) | Particle height (nm) | Aspect ratio | Hydrophobic treatment for surface | Hydrophobic treatment method | Surface free energy | Adhesive force of toner | | Transferability to embossed paper | | Transfer-ability to emboss for high-speed machine |
|---|---|---|---|---|---|---|---|---|---|---|---|---|---|
| | | | | | | | | | Initial stage | Sustain-ability | Initial stage | Sustain-ability | |
| | 10 | $SiO_2$ | 100 | 40 | 1 | Performed | PDMS | 81 | 13 | 13 | B (○) | B (○) | C (Δ) |
| | 11 | $SiO_2$ | 100 | 65 | 1 | Performed | OTES | 45 | 10 | 10 | A (◎) | A (◎) | B (○) |
| | 12 | $SiO_2$ | 100 | 115 | 1 | Performed | OTES | 45 | 12 | 12 | B (○) | B (○) | B (○) |
| | 13 | $SiO_2$ | 100 | 115 | 1 | Performed | Amino Silane | 55 | 11 | 11 | B (○) | B (○) | B (○) |
| Comparative Example | 1 | N/A | — | — | — | — | — | 90 | 17 | 21 | D (X) | D (X) | D (X) |
| | 2 | $SiO_2$ | 1100 | 40 | 1 | Performed | TMS conversion | 25 | 11 | 15 | B (○) | C (Δ) | C (Δ) |
| | 3 | $SiO_2$ | 100 | 12 | 1 | Performed | TMS conversion | 25 | 12 | 15 | B (○) | C (Δ) | C (Δ) |
| | 4 | $SiO_2$ | 100 | 350 | 1.3 | Performed | TMS conversion | 25 | 12 | 17 | B (○) | D (X) | C (Δ) |
| | 5 | BN | 100 | 200 | 5 | Performed | TMS conversion | 89 | 14 | 18 | B (○) | D (X) | D (X) |

The above results tell that the intermediate transfer belts of the present examples outperform the intermediate transfer belts of comparative examples, in terms of sustainability of toner transfer to paper having roughness.

Examples 9, 10, and 13 are examples in which the surface free energy exceeds 54 mJ/m$^2$. Particularly, Example 10 is an example that has the same particle spacing, particle height, and aspect ratio as the particle spacing, particle height, and aspect ratio of Example 1, has undergone a surface treatment by a method different from the surface treatment method for Example 1, and has a surface free energy exceeding 54 mJ/m$^2$. The above results also tell that compared to Example 1, Example 10 exhibits better transferability to embossed paper in a case where Example 10 is used for a high-speed machine.

The present exemplary embodiment includes the following aspects.

(((1)))

An intermediate transfer belt comprising:

metal oxide particles as a solid lubricant on a surface thereof;

wherein an average spacing between the metal oxide particles on the surface is 1,000 nm or less; and an average height of the metal oxide particles from the surface is 15 nm or more and 320 nm or less.

(((2)))

The intermediate transfer belt according to (((1))), wherein the average spacing between the metal oxide particles on the surface is 3 nm or more and 200 nm or less.

(((3)))

The intermediate transfer belt according to (((1))) or (((2))), wherein the average height of the metal oxide particles from the surface is 30 nm or more and 150 nm or less.

(((4)))

The intermediate transfer belt according to any one of (((1))) to (((3))), wherein an aspect ratio of the metal oxide particles is 1 or more and 1.8 or less.

(((5)))

The intermediate transfer belt according to (((4))), wherein the aspect ratio of the metal oxide particles is 1 or more and 1.4 or less.

(((6)))

The intermediate transfer belt according to any one of (((1))) to (((5))), wherein a surface of the metal oxide particles has undergone the hydrophobic treatment.

(((7)))

The intermediate transfer belt according to (((6))), wherein the surface of the metal oxide particles has undergone a hydrophobic treatment with at least one hydrophobic treatment agent selected from the group consisting of methyltrimethoxysilane, dimethyldimethoxysilane, trimethylchlorosilane, trimethylmethoxysilane, octyltriethoxysilane, hexamethyldisilazane, and tetramethyldisilazane.

(((8)))

The intermediate transfer belt according to any one of (((1))) to (((7))), wherein the metal oxide particles are at least one kind of particles selected from the group consisting of silica particles, titania particles, alumina particles, cerium oxide particles, magnesium oxide particles, zinc oxide particles, and zirconia particles.

(((9)))

The intermediate transfer belt according to (((8))), wherein the metal oxide particles are silica particles.

(((10)))

The intermediate transfer belt according to any one of (((1))) to (((9))), wherein a surface free energy of the metal oxide particles is 54 mJ/m$^2$ or less.

(((11)))

A transfer device comprising:

the intermediate transfer belt according to any one of (((1))) to (((10))) having a surface to which a toner image is to be transferred;

a primary transfer device that has a primary transfer member performing primary transfer of a toner image formed on a surface of an image holder to the surface of the intermediate transfer belt;

a secondary transfer device that has a secondary transfer member which is arranged in contact with the surface of the intermediate transfer belt and performs secondary transfer of the toner image transferred to the surface of the intermediate transfer belt to a surface of a recording medium;

a cleaning device that has a cleaning blade cleaning the surface of the intermediate transfer belt; and a metal oxide particle supply device that is provided in contact with the surface of the intermediate transfer belt and supplies metal oxide particles as a solid lubricant to the surface of the intermediate transfer belt.

(((12)))

An image forming apparatus comprising:

a toner image forming device that has an image holder and forms a toner image on a surface of the image holder; and the transfer device according to (((11))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An intermediate transfer belt comprising:

metal oxide particles as a solid lubricant on a surface of the intermediate transfer belt;

wherein an average spacing between the metal oxide particles on the surface is 1,000 nm or less, and an average height of the metal oxide particles from the surface is 15 nm or more and 320 nm or less.

2. The intermediate transfer belt according to claim 1, wherein the average spacing between the metal oxide particles on the surface is 3 nm or more and 200 nm or less.

3. The intermediate transfer belt according to claim 1, wherein the average height of the metal oxide particles from the surface is 30 nm or more and 150 nm or less.

4. The intermediate transfer belt according to claim 1, wherein an aspect ratio of the metal oxide particles is 1.0 or more and 1.8 or less.

5. The intermediate transfer belt according to claim 4, wherein the aspect ratio of the metal oxide particles is 1.0 or more and 1.4 or less.

6. The intermediate transfer belt according to claim 1, wherein a surface of the metal oxide particles has undergone a hydrophobic treatment.

7. The intermediate transfer belt according to claim 6, wherein the surface of the metal oxide particles has undergone the hydrophobic treatment with at least one hydrophobic treatment agent selected from the group consisting of methyltrimethoxysilane, dimethyldimethoxysilane, trimethylchlorosilane, trimethylmethoxysilane, octyltriethoxysilane, hexamethyldisilazane, and tetramethyldisilazane.

8. The intermediate transfer belt according to claim 1, wherein the metal oxide particles are at least one kind of particles selected from the group consisting of silica particles, titania particles, alumina particles, cerium oxide particles, magnesium oxide particles, zinc oxide particles, and zirconia particles.

9. The intermediate transfer belt according to claim 8, wherein the metal oxide particles are silica particles.

10. The intermediate transfer belt according to claim 1, wherein a surface free energy of the metal oxide particles is 54 $mJ/m^2$ or less.

11. A transfer device comprising:

the intermediate transfer belt according to claim 1 having a surface to which a toner image is to be transferred;

a primary transfer device that has a primary transfer member performing primary transfer of a toner image formed on a surface of an image holder to the surface of the intermediate transfer belt;

a secondary transfer device that has a secondary transfer member which is arranged in contact with the surface of the intermediate transfer belt and performs secondary transfer of the toner image transferred to the surface of the intermediate transfer belt to a surface of a recording medium;

a cleaning device that has a cleaning blade cleaning the surface of the intermediate transfer belt; and a metal oxide particle supply device that is provided in contact with the surface of the intermediate transfer belt and supplies metal oxide particles as a solid lubricant to the surface of the intermediate transfer belt.

12. An image forming apparatus comprising:

a toner image forming device that has an image holder and forms a toner image on a surface of the image holder; and the transfer device according to claim 11 that is a transfer device transferring the toner image formed on the surface of the image holder to a surface of a recording medium.

* * * * *